United States Patent
Koi

(10) Patent No.: US 9,666,892 B2
(45) Date of Patent: May 30, 2017

(54) CELL, CELL STACK DEVICE, MODULE, AND MODULE HOUSING DEVICE

(71) Applicant: KYOCERA Corporation, Kyoto-shi, Kyoto (JP)

(72) Inventor: Makoto Koi, Kirishima (JP)

(73) Assignee: KYOCERA CORPORATION, Kyoto-shi (JP)

( * ) Notice: Subject to any disclaimer, the term of this patent is extended or adjusted under 35 U.S.C. 154(b) by 4 days.

(21) Appl. No.: 14/898,910

(22) PCT Filed: Jun. 27, 2014

(86) PCT No.: PCT/JP2014/067191
§ 371 (c)(1),
(2) Date: Dec. 16, 2015

(87) PCT Pub. No.: WO2014/208730
PCT Pub. Date: Dec. 31, 2014

(65) Prior Publication Data
US 2016/0372774 A1   Dec. 22, 2016

(30) Foreign Application Priority Data

Jun. 27, 2013 (JP) ................................. 2013-135186
Oct. 22, 2013 (JP) ................................. 2013-219382

(51) Int. Cl.
*H01M 4/00* (2006.01)
*H01M 8/1253* (2016.01)
(Continued)

(52) U.S. Cl.
CPC ............ *H01M 8/1253* (2013.01); *C25B 1/04* (2013.01); *C25B 1/10* (2013.01); *C25B 9/08* (2013.01);
(Continued)

(58) Field of Classification Search
CPC ... C25B 1/04; C25B 9/08; C25B 1/10; H01M 2004/8684; H01M 8/1246; H01M 8/243;
(Continued)

(56) References Cited

U.S. PATENT DOCUMENTS 6,139,985 A * 10/2000 Borglum ............. H01M 4/9033
429/465
2008/0075984 A1   3/2008 Badding et al.

FOREIGN PATENT DOCUMENTS

EP   2355217 A1   8/2011
JP   08-50913 A   2/1996
(Continued)

OTHER PUBLICATIONS

International Search Report (Form PCT/ISA/210) mailed on Aug. 26, 2014 and issued for International Application No. PCT/JP2014/067191.

(Continued)

*Primary Examiner* — Mark F Huff
*Assistant Examiner* — Monique Wills
(74) *Attorney, Agent, or Firm* — Viering, Jentschura & Partner

(57) ABSTRACT

The cell of the present invention includes an element portion and a first layer. The element portion includes a first electrode layer, a second electrode layer and a solid electrolyte layer. The first electrode layer serves as a tubular support body. The solid electrolyte layer is located between the first electrode layer and the second electrode layer. The solid electrolyte layer contains an oxide as a primary component and a first content of a rare earth element. The solid electrolyte layer has a thickness of 30 μm or less. The solid electrolyte layer has a region devoid of the second electrode layer. The first layer is located in the region. The first layer contains the oxide as a primary component and a second (Continued)

content of the rare earth element. The second content is different from the first content. The first layer has a higher strength than the solid electrolyte layer.

14 Claims, 10 Drawing Sheets

(51) Int. Cl.
| | |
|---|---|
| C25B 1/04 | (2006.01) |
| C25B 9/10 | (2006.01) |
| H01M 8/1246 | (2016.01) |
| H01M 8/243 | (2016.01) |
| H01M 8/00 | (2016.01) |
| H01M 8/2457 | (2016.01) |
| C25B 1/10 | (2006.01) |
| C25B 9/08 | (2006.01) |
| H01M 4/86 | (2006.01) |
| H01M 4/88 | (2006.01) |
| H01M 4/90 | (2006.01) |
| H01M 8/0612 | (2016.01) |
| H01M 8/1226 | (2016.01) |
| H01M 8/124 | (2016.01) |

(52) U.S. Cl.
CPC ............. *C25B 9/10* (2013.01); *H01M 4/8605* (2013.01); *H01M 4/8652* (2013.01); *H01M 4/881* (2013.01); *H01M 4/8828* (2013.01); *H01M 4/9025* (2013.01); *H01M 4/9033* (2013.01); *H01M 8/004* (2013.01); *H01M 8/0618* (2013.01); *H01M 8/1226* (2013.01); *H01M 8/1246* (2013.01); *H01M 8/243* (2013.01); *H01M 8/2457* (2016.02); *H01M 2004/8684* (2013.01); *H01M 2004/8689* (2013.01); *H01M 2008/1293* (2013.01); *H01M 2300/0077* (2013.01); *Y02E 60/366* (2013.01); *Y02E 60/525* (2013.01)

(58) Field of Classification Search
CPC .......... H01M 8/004; H01M 2004/8689; H01M 2300/0077; H01M 8/1253; H01M 8/1226; H01M 8/0618; H01M 4/9033; H01M 4/9025; H01M 4/8828; H01M 4/881; H01M 4/8652; H01M 4/8605; Y02E 60/366; Y02E 60/525
See application file for complete search history.

(56) References Cited

FOREIGN PATENT DOCUMENTS

| | | |
|---|---|---|
| JP | 09-063603 A | 3/1997 |
| JP | 11-111309 A | 4/1999 |
| JP | 2004-146334 | 5/2004 |
| JP | 2008-084716 A | 4/2008 |
| JP | 2011076809 A | 4/2011 |
| WO | 2013/077445 A1 | 5/2013 |

OTHER PUBLICATIONS

European Search Report issued in the counterpart European Patent Application No. 14 817 280.2, dated Nov. 17, 2016.

* cited by examiner

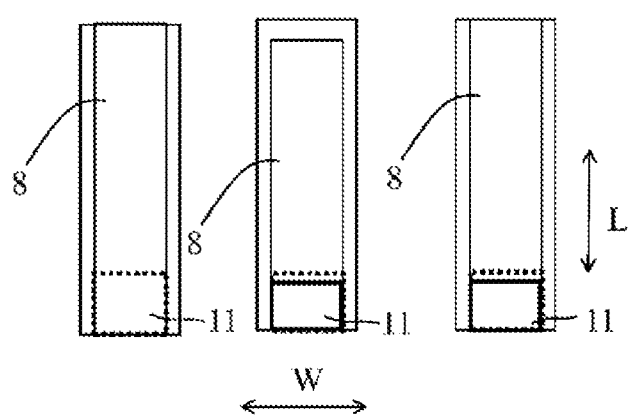

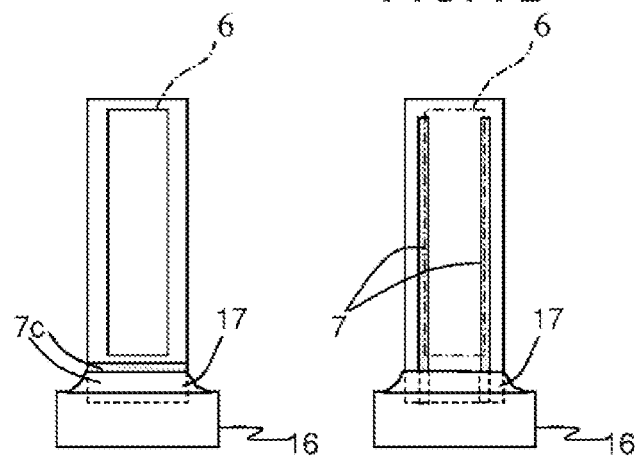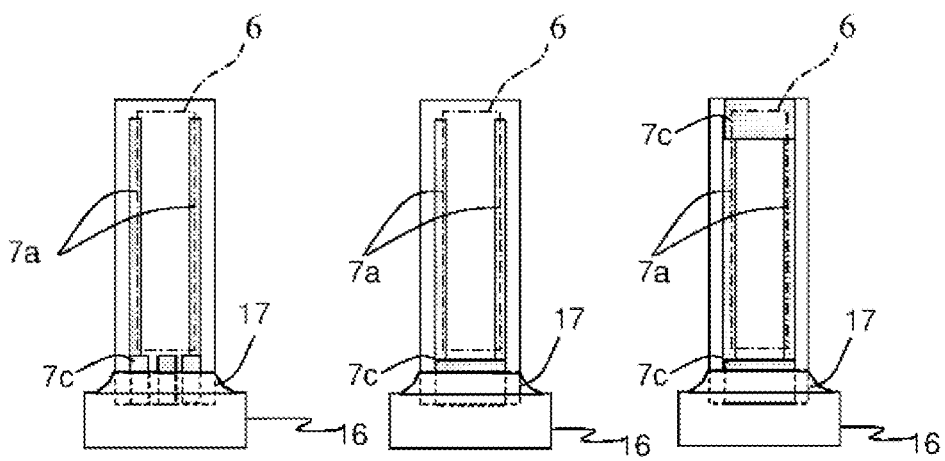

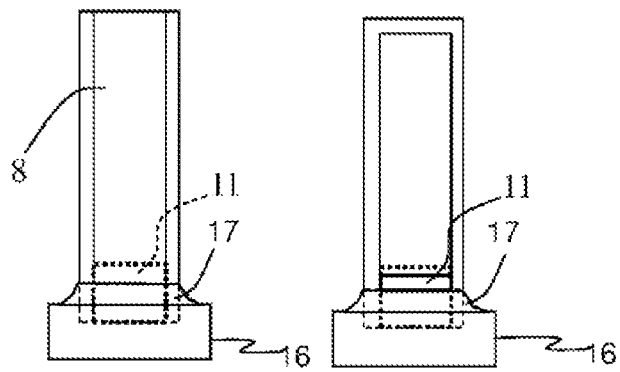
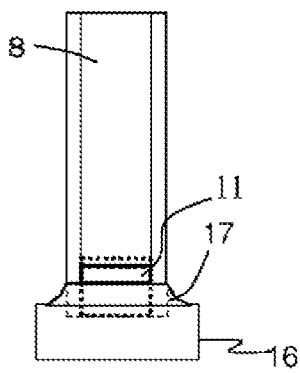

CELL, CELL STACK DEVICE, MODULE, AND MODULE HOUSING DEVICE

TECHNICAL FIELD

The present invention relates to a cell, a cell stack device, a module, and a module housing device.

BACKGROUND

Various fuel cell devices that house cell stack devices made of a plurality of solid oxide fuel cells electrically connected in series in a housing container have been recently proposed as next-generation energy devices.

An example of a proposed solid oxide fuel cell of such fuel cell devices is a solid oxide fuel cell including a support body having a pair of mutually parallel flat faces and having a fuel gas passage for circulating fuel gas on the interior, wherein a fuel electrode layer, a solid electrolyte layer, and an oxygen electrode layer are laminated in that order on the flat face on one side of the support body, and an interconnector layer is laminated on the flat face on the other side (for example, see Patent Document 1). In addition, fuel cells called cylindrical types and banded types have also been proposed.

PRIOR ART DOCUMENT

Patent Document

Patent Document 1: Japanese Unexamined Patent Application Publication No. 2008-84716A

SUMMARY OF THE INVENTION

Problems to be Solved by the Invention

Various types of fuel cells have been proposed as described above, and recently, the thickness of the solid electrolyte layer has been reduced in order to improve power generation performance since ion conduction improves and fuel cell power generation performance improves as the thickness of the solid electrolyte layer decreases. On the other hand, when the thickness of the solid electrolyte layer is decreased in order to improve power generation performance, the strength improvement effect of the solid electrolyte layer decreases, and there is risk of cracking in the fuel cell.

An object of the present invention is to provide a cell, a cell stack device, a module, and a module housing device that can suppress cracking.

Means to Solve the Problem

The cell of the present invention includes an element portion and a first layer. The element portion includes a first electrode layer, a second electrode layer and a solid electrolyte layer. The first electrode layer serves as a tubular support body. The solid electrolyte layer is located between the first electrode layer and the second electrode layer. The solid electrolyte layer contains an oxide as a primary component and a first content of a rare earth element. The solid electrolyte layer has a thickness of 30 μm or less. The solid electrolyte layer has a region devoid of the second electrode layer. The first layer is located in the region. The first layer contains the oxide as a primary component and a second content of the rare earth element. The second content is different from the first content. The first layer has a higher strength than the solid electrolyte layer.

Furthermore, the cell of the present invention includes a plurality of element portions and a first layer. The plurality of element portions are on an insulating elliptical tubular support body. Each element portion includes a first electrode layer, a second electrode layer and a solid electrolyte layer. The first electrode layer located on the insulating elliptical tubular support body. The solid electrolyte layer is located between the first electrode layer and the second electrode layer. The solid electrolyte layer contains an oxide as a primary component and a first content of a rare earth element. The solid electrolyte layer has a thickness of 30 μm or less. The solid electrolyte layer has a region devoid of the second electrode layer. The first layer is located in the region. The first layer contains the oxide as a primary component and a second content of the rare earth element. The second content is different from the first content. The first layer has a higher strength than the solid electrolyte layer.

Additionally, the cell of the present invention includes a support body, an element portion and a first layer. The support body has a elliptical tubular shape. The support body includes a first main face, a second main face, a first portion, a second portion. The first main face is on one side in a thickness direction of the support body. The second main face is on the other side in the thickness direction. The first portion is located at one end in a length direction of the support body. The second portion is located at the other end in the length direction. The element portion is on the first main face. The element portion includes a first electrode layer, a second electrode layer and a solid electrolyte layer. The first electrode layer is located on the first main face. The solid electrolyte layer is located between the first electrode layer and the second electrode layer. The solid electrolyte layer contains an oxide as a primary component and a first content of a rare earth element. The solid electrolyte layer has a thickness of 30 μm or less. The solid electrolyte layer has a region devoid of the second electrode layer. The first layer is located in the region. The first layer contains the oxide as a primary component and a second content of the rare earth element. The second content is different from the first content. The first layer has a higher strength than the solid electrolyte layer.

The cell stack device of the present invention includes a plurality of the above cells, and is configured to electrically connect the plurality of cells.

The module of the present invention is configured to house the above cell stack device in a housing container.

The module housing device of the present invention is configured to house the above module and an auxiliary device for actuating the module in an exterior case.

Effect of the Invention

In the cell of the present invention, because the thickness of the solid electrolyte layer is as thin as 30 μm or less, cell performance can be improved and the solid electrolyte layer can be reinforced, and cracking in the cell can be prevented. As a result, a cell stack device, module, and module housing device with high performance and long-term reliability can be provided.

BRIEF DESCRIPTION OF THE DRAWING(S)

FIGS. 1A to 1D illustrate examples of a cylindrical type and a banded type of solid oxide fuel cell; FIG. 1A is a partially cut-away perspective view; FIG. 1B is a longitudinal cross-sectional view; FIG. 1C is a perspective view; and FIG. 1D is a longitudinal cross-sectional view of one end side.

FIGS. 2A to 2C illustrate a hollow plate solid oxide fuel cell; FIG. 2A is a horizontal cross-sectional view; FIG. 2B is a horizontal cross-sectional view of one end portion side; and FIG. 2C is a side view seen from the oxygen electrode layer side.

FIGS. 3A to 3G are side views illustrating examples of the first layer in the solid electrolyte layer.

FIG. 4A is a horizontal cross-sectional view; and FIG. 4B is a side view of FIG. 4A seen from the interconnector layer side.

FIGS. 5A to 5C illustrate a hollow plate solid oxide fuel cell; FIGS. 5A to 5C are side views illustrating examples of the second layer.

FIG. 6A is a side view schematically illustrating the cell stack device; and FIG. 6B is an enlarged cross-sectional view illustrating a portion of the cell stack of FIG. 6A surrounded by dotted lines.

Figures 3A, 3B, 3C, 3D:
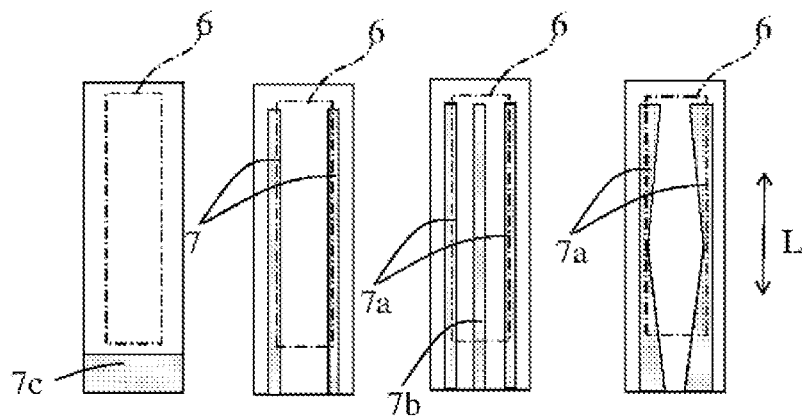
FIGS. 3A to 3G illustrate a hollow plate solid oxide fuel cell.
Figures 3E, 3F, 3G:
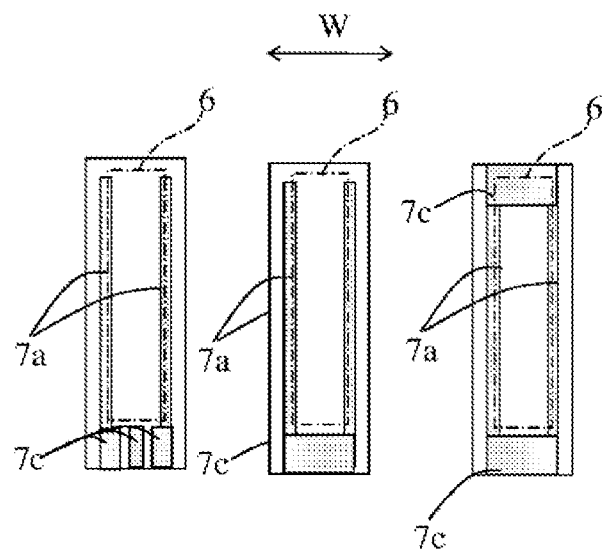

FIG. 7A is a side view illustrating the cell of FIG. 3A in a state where it has been affixed to a gas tank using a bonding material, FIG. 7B is a side view illustrating the cell of FIG. 3D in a state where it has been affixed to a gas tank, FIG. 7C is a side view illustrating the cell of FIG. 3E in a state where it has been affixed to a gas tank, and FIG. 7D is a side view illustrating the cell of FIG. 3F in a state where it has been affixed to a gas tank.

FIG. 8A is a side view illustrating the cell of FIG. 5A in a state where it has been affixed to a gas tank using a bonding material, FIG. 8B is a side view illustrating the cell of FIG. 5B in a state where it has been affixed to a gas tank, and FIG. 8C is a side view illustrating the cell of FIG. 5C in a state where it has been affixed to a gas tank.

Figure 9:
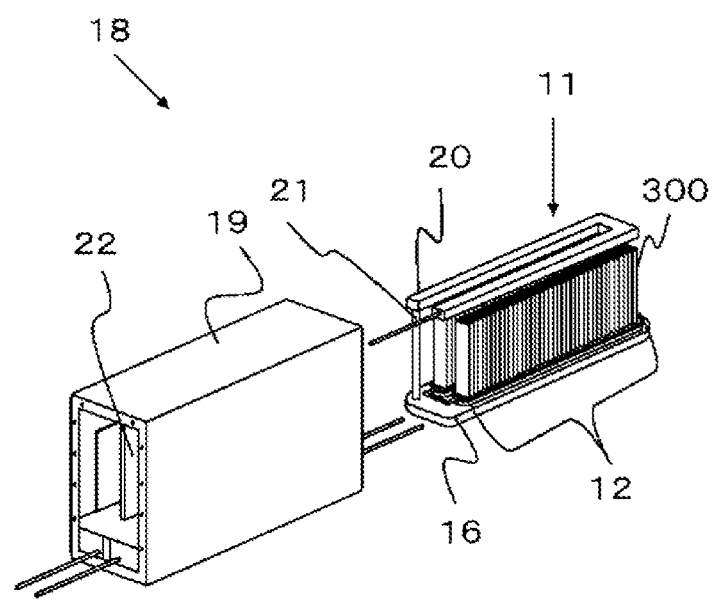

FIG. 9 is an exterior perspective view of an example of a fuel cell module.

Figure 10:
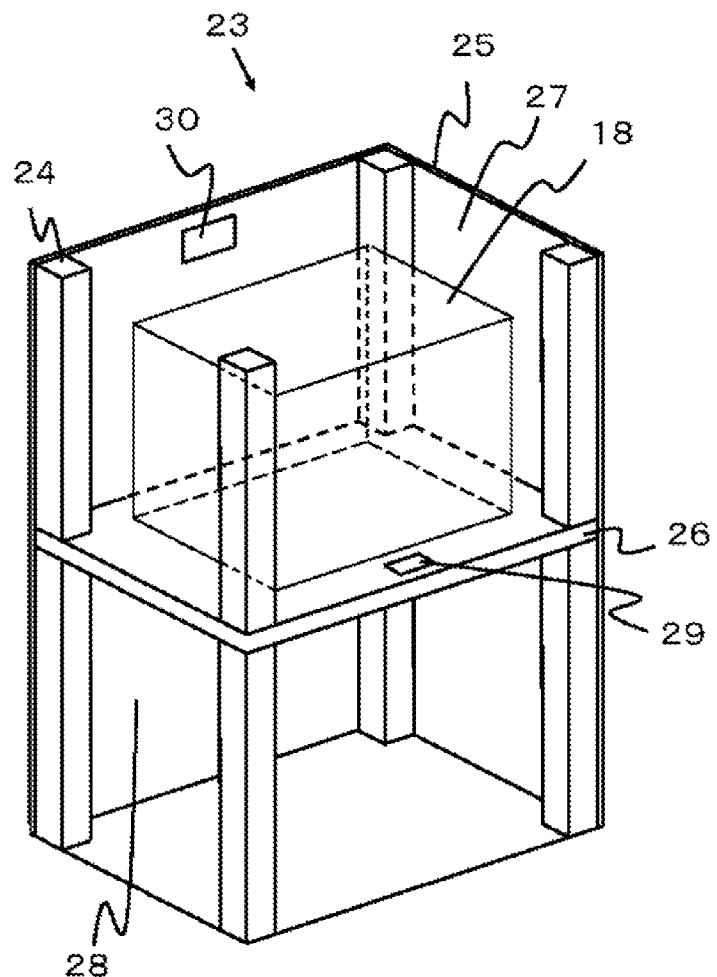

FIG. 10 is a perspective view of the fuel cell device with a portion of it omitted.

BEST MODE FOR CARRYING OUT THE INVENTION

Figure 1A:
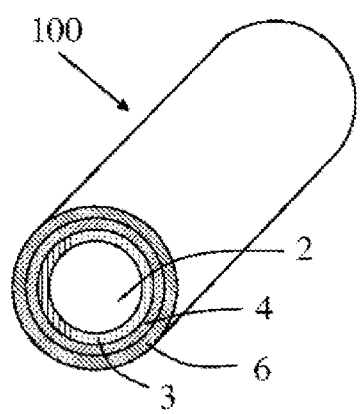
Figure 1B:
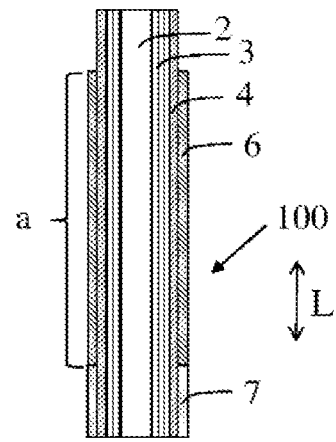
Figure 1C:
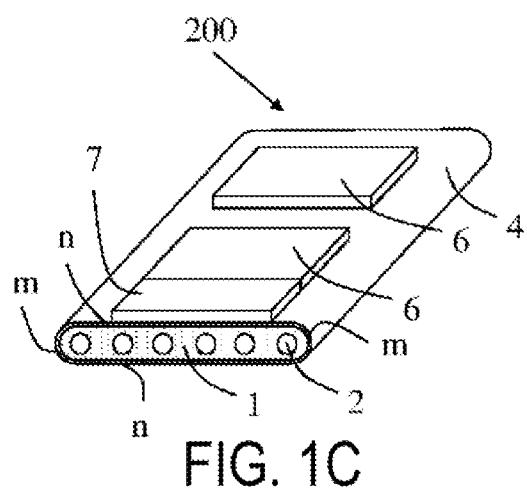
Figure 1D:
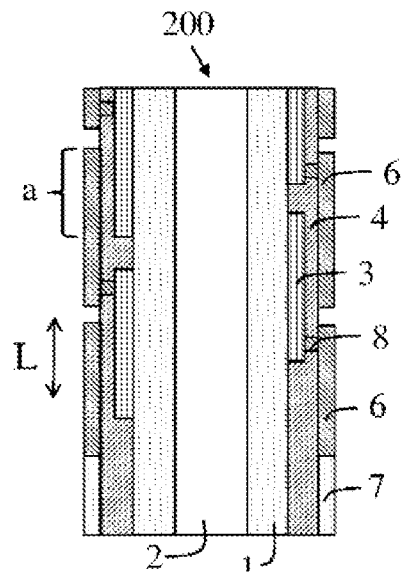
Figure 2A:
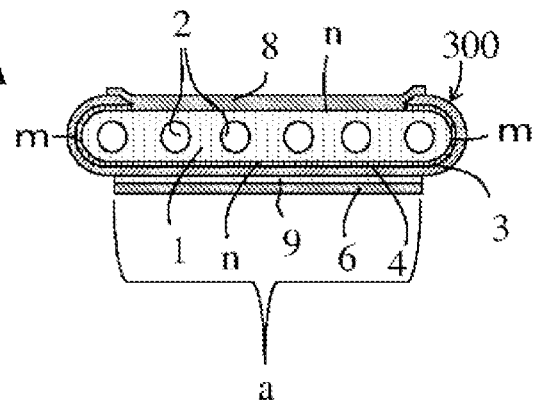
Figure 2B:
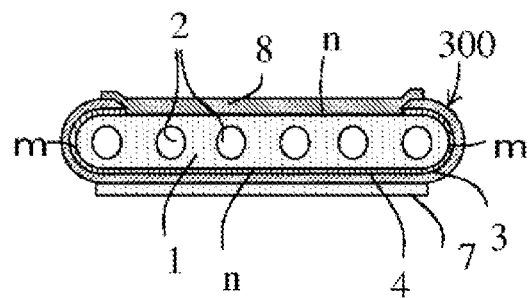
Figure 2C:
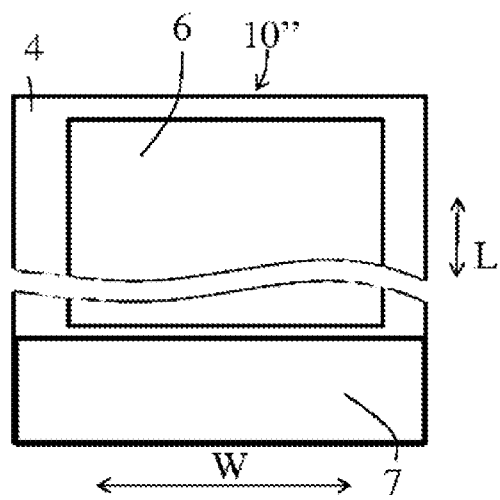

FIGS. 1A to 1D illustrate examples of a cylindrical type and a banded type of solid oxide fuel cell (hereinafter, sometimes abbreviated to "fuel cell"); FIG. 1A is a partially cut-away perspective view; FIG. 1B is a longitudinal cross-sectional view; FIG. 1C is a perspective view, and FIG. 1D is a longitudinal cross-sectional view of one end side. FIGS. 2A to 2C illustrate a hollow plate solid oxide fuel cell; FIG. 2A is a horizontal cross-sectional view thereof; FIG. 2B is a horizontal cross-sectional view of one end portion side; and FIG. 2C is a side view seen from the oxygen electrode layer side. The drawings are enlarged views of a portion of each of the configurations of the fuel cells 100, 200, and 300. Below, the same constituents will be described using the same reference numerals. First, the constituents of each of the fuel cells will be described below.

The fuel cell 100 illustrated in FIGS. 1A and 1B is an example of a so-called cylindrical fuel cell, wherein a compact solid electrolyte layer 4 and a porous oxygen electrode layer (second electrode layer) 6 are laminated in that order on a porous fuel electrode layer (first electrode layer) 3 also serving as a tubular support body, to form a cylindrical shape. Furthermore, the interior of the fuel electrode layer 3 is used as a fuel gas passage 2 through which fuel gas flows, the fuel gas passage 2 being provided along the longitudinal direction L.

Preferably, the solid electrolyte layer 4 is made of a ceramic having a gas barrier property and a thickness of not greater than 30 μm, and in particular, a thickness of not greater than 20 μm and more preferably not greater than 15 μm is desirable from the perspective of improving power generation performance.

In this cylindrical fuel cell 100, the region where the fuel electrode layer 3, solid electrolyte layer 4, and oxygen electrode layer 6 are laminated functions as an element portion (a) which generates power. Specifically, oxygen-containing gas such as air is made to flow on the outside of the oxygen electrode layer 6 and fuel gas (hydrogen-containing gas) is made to flow in the fuel gas passage 2, and power is generated by heating to a specified actuation temperature.

Furthermore, as illustrated in FIG. 1B, in the present embodiment, an oxygen electrode layer 6 is not provided on one end portion (lower end portion) and the other end portion (upper end portion) of the fuel cell 100. Specifically, the regions of the solid electrolyte layer 4 devoid of the oxygen electrode layer 6 are at one end portion and the other end portion of the fuel electrode layer 3 which also serves as the support body. Also, a first layer 7 to be described later is provided on the one end portion devoid of the oxygen electrode layer 6.

The fuel cell 200 illustrated in FIGS. 1C and 1D is an example of a so-call banded fuel cell, which has an insulating support body 1 having a flat cross-section and having an elliptical tubular shape as the whole (in other words, an elliptical columnar shape). On the interior of the support body 1, a plurality of fuel gas passages 2 is formed at appropriate intervals, penetrating in the longitudinal direction L of the fuel cell 200.

As is understood from the shape illustrated in FIG. 1C, the support body 1 is configured from a pair of mutually parallel level faces n and arced faces (side faces) m which connect the pair of level faces n. The two level faces n are formed substantially parallel to each other, and on each of the level faces n, a porous fuel electrode layer 3, a compact solid electrolyte layer 4, and a porous oxygen electrode layer 6 are provided as one set such that a plurality of sets adjoin, and these are electrically connected by a compact interconnector layer 8. Furthermore, the region where the fuel electrode layer 3, solid electrolyte layer 4, and oxygen electrode layer 6 are laminated functions as an element portion (a) which generates power. Specifically, oxygen-containing gas such as air is made to flow on the outside of the oxygen electrode layer 6 and fuel gas (hydrogen-containing gas) is made to flow in the fuel gas passages 2 on the interior of the support body 1, and power is generated by heating to a prescribed actuation temperature. Furthermore, the solid electrolyte layer 4 has a thickness preferably of not greater than 30 μm, and in particular, a thickness of not greater than 20 μm and more preferably not greater than 15 μm is desirable from the perspective of improving power generation performance.

In a region where these sets are not provided, a solid electrolyte layer 4 made of a ceramic having a gas barrier property is provided to prevent the gas flowing through the fuel gas passages 2 from leaking to the exterior. Specifically, the solid electrolyte layer 4 and the interconnector layer 8 prevent the fuel gas circulating on the interior from leaking to the exterior.

FIG. 1D illustrates an example in which one layer each of the fuel electrode layer 3 and oxygen electrode 6 are provided on the insulating support body 1, but it may also be configured from two or more of each layer, and further, at least a part of the fuel electrode layer 3 may be embedded in the support body 1.

In the banded fuel cell 200 as well, as illustrated in FIG. 1D, an oxygen electrode layer 6 is not provided on one end portion (lower end portion) of the fuel cell 200. Specifically, a region of the solid electrolyte layer 4 devoid of the oxygen electrode layer 6 is on one end portion of the support body 1. Also, a first layer 7 to be described later is provided on the one end portion devoid of the oxygen electrode layer 6.

FIGS. 2A to 2C illustrate a hollow plate solid oxide fuel cell 300, wherein FIG. 2A is a horizontal section view thereof, FIG. 2B is a horizontal section view of one end portion side, and FIG. 2C is a side view seen from the oxygen electrode layer side.

The fuel cell 300 illustrated in FIGS. 2A to 2C is a hollow plate type, which has an electrically conductive support body 1 having a flat cross-section and having an elliptical cylindrical shape as the whole (in other words, an elliptical columnar shape). On the interior of the support body 1, a plurality of fuel gas passages 2 is formed at appropriate intervals, penetrating in the longitudinal direction L of the fuel cell 300, and the fuel cell 300 has a structure in which various members are provided on the support body 1.

In the fuel cell 300 illustrated in FIGS. 2A to 2C, as is understood from the shape illustrated in FIG. 2A, the support body 1 is configured from a pair of mutually parallel level faces n and arced faces (side faces) m which connect the pair of level faces n. The two level faces n are formed substantially parallel to each other, and the porous fuel electrode layer (first electrode layer) 3 is disposed so as to cover one of the level faces n (main face on one side: bottom face) and the arced faces m on both sides, and additionally, a solid electrolyte layer 4 with a thickness of not greater than 30 μm made of a ceramic having a gas barrier property is disposed so as to cover the fuel electrode layer 3. The thickness of the solid electrolyte layer 4 is, in particular, preferably not greater than 20 μm and more preferably not greater than 15 μm from the perspective of improving power generation performance.

On the surface of the solid electrolyte layer 4, a porous oxygen electrode layer (second electrode layer) 6 is disposed so as to oppose the fuel electrode layer 3 with an intermediate layer 9 interposed. The intermediate layer 9 is formed on the solid electrolyte layer 4 on which the oxygen electrode layer 6 is formed. Furthermore, although not illustrated, an intermediate layer 9 may be similarly provided in the cylindrical fuel cell 100 or banded fuel cell 200 illustrated in FIGS. 1A to 1D.

On the other level face n (main face on the other side: top face) on which the oxygen electrode layer 6 is not laminated, an interconnector layer 8 made of an electrically conductive ceramic having a gas barrier property is formed.

Specifically, in the fuel cell 300, the fuel electrode layer 3 and solid electrolyte layer 4 are formed reaching from one of the level faces (main face on one side: bottom face), passing through the arced face m on the two end portions, to the other level face n (main face on other side: top face), and the two end portions of the interconnector layer 8 are laminated and bonded on the two end portions of the solid electrolyte layer 4. The solid electrolyte layer 4 is formed on the entirety of the main face on one side.

Furthermore, the support body 1 is enclosed by the solid electrolyte layer 4 and the interconnector layer 8, which have a gas barrier property, such that the fuel gas circulating on the interior does not leak to the exterior. In other words, an elliptical cylinder body which has a gas barrier property is formed by the solid electrolyte layer 4 and the interconnector layer 8, and the interior of the elliptical cylinder body is used as a fuel gas passage, and the fuel gas supplied to the fuel electrode layer 3 and the oxygen-containing gas supplied to the oxygen electrode layer 6 are blocked by the elliptical cylinder body.

Described more specifically, as illustrated in FIG. 2C, the oxygen electrode layer 6 whose planar shape is rectangular is formed except on the upper and lower end portions of the support body 1, while on the other hand, the interconnector layer 8 (not illustrated) is formed on the support body 1 from the top end to the bottom end thereof, and both the left and right end portions thereof are bonded to the surfaces of both the left and right end portions of the solid electrolyte layer 4. Furthermore, the interconnector layer 8, as will be described later, can be configured without the lower end portion being provided.

Here, in the fuel cell 300, the portion where the fuel electrode layer 3 and the oxygen electrode layer 6 face each other with the solid electrolyte layer 4 interposed functions as a power generating element portion (a). Specifically, oxygen-containing gas such as air is made to flow on the outside of the oxygen electrode layer 6 and fuel gas (hydrogen-containing gas) is made to flow in the fuel gas passage 2 on the interior of the support body 1, and power is generated by heating to a prescribed actuation temperature. The current produced by such power generation is collected via the interconnector layer 8 provided on the support body 1.

In the hollow plate fuel cell 300 as well, as illustrated in FIGS. 2B and 2C, an oxygen electrode layer 6 is not provided on one end portion (lower end portion) of the fuel cell 300. Specifically, the region of the solid electrolyte layer 4 devoid of the oxygen electrode layer 6 is at one end portion of the support body 1. A first layer 7 to be described later is also provided on the one end portion devoid of the oxygen electrode layer 6.

Each member that constitutes the fuel cell of the present embodiment will be described below using the fuel cell 300. Furthermore, the same members as described below may also be used in the fuel cells 100 and 200 unless otherwise noted.

Because the support body 1 must be gas-permeable to transmit the fuel gas to the fuel electrode layer 3 and must be electrically conductive to collect current via the interconnector layer 8, it is preferably formed from, for example, Ni and/or NiO and an inorganic oxide such as a specified rare earth element oxide.

The specified rare earth element oxide is used to bring the thermal expansion coefficient of the support body 1 closer to that of the solid electrolyte layer 4. A rare earth element oxide containing at least one element selected from the group consisting of Y, Lu, Yb, Tm, Er, Ho, Dy, Gd, Sm, and Pr may be used in combination with Ni and/or NiO. Specific examples of such a rare earth element oxide include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$, among which $Y_2O_3$ and $Yb_2O_3$ are preferred because they nearly do not form a solid solution or react with the Ni and/or NiO, their thermal expansion coefficients are similar to that of the solid electrolyte layer 4, and they are inexpensive.

In the present embodiment, when using an electrically conductive support body 1 as the support body 1, it is preferable that the volume ratio of Ni and/or NiO to rare earth element oxide is from 35:65 to 65:35 from the perspectives of maintaining good electric conductivity and having a thermal expansion coefficient close to that of the solid electrolyte layer 4.

When using an insulating support body 1 as the support body 1, it is preferable that it be formed of magnesium oxide (MgO), Ni and/or NiO, and a specified rare earth element oxide. The rare earth element oxides that are the same as described above may be used. The insulating support body 1 preferably contains from 70 to 80 volume % of MgO, from 10 to 20 volume % of rare earth element oxide, and from 10 to 25 volume % of Ni and/or NiO, and, as a whole, has resistivity of not less than 10 Ω·cm.

The support body 1 may also contain other metal components and oxide components within a range such that the required characteristics are not impaired.

Because the support body 1 must be permeable to fuel gas, it is porous and normally has porosity of not less than 30%, and particularly preferably from 35 to 50%. The electric conductivity of the support body 1 is not less than 300 S/cm, and particularly preferably not less than 440 S/cm.

The length of the flat faces n of the support body (length in the width direction W of the support body 1) is, for example, from 15 to 35 mm; the length of the arced faces m (length of arc) is, for example, from 2 to 8 mm; and the thickness of the support body 1 (thickness between flat faces n) is from 1.5 to 5 mm. The length of the support body 1 is, for example, from 100 to 300 mm.

The fuel electrode layer 3 produces an electrode reaction, and the fuel electrode layer 3 itself can be formed by a known porous electrically conductive ceramic. For example, the fuel electrode layer 3 may be formed from $ZrO_2$ in which a rare earth element has formed a solid solution or $CeO_2$ in which a rare earth element has formed a solid solution, and Ni and/or NiO. As the rare earth element, the rare earth elements given as examples for the support body 1 may be used. The fuel electrode layer 3 may be formed from, for example, $ZrO_2$ (YSZ) in which Y has formed a solid solution, and Ni and/or NiO.

The content of $ZrO_2$ in which the rare earth element has formed a solid solution or $CeO_2$ in which the rare earth element has formed a solid solution is preferably from 35 to 65 volume %, and the content of Ni and/or NiO is preferably from 65 to 35 volume %. The porosity of the fuel electrode layer 3 is not less than 15% and particularly preferably from 20 to 40%, and the thickness thereof is preferably from 1 to 30 μm.

Because the fuel electrode layer 3 may be formed in a position that opposes the oxygen electrode layer 6, the fuel electrode layer 3 may be formed, for example, only on the flat face n on the bottom side of the support body 1 on which the oxygen electrode layer 6 is provided. Specifically, it may be structured such that the fuel electrode layer 3 is provided only on the flat face n on the bottom side of the support body 1, and the solid electrolyte layer 4 is provided on the surface of the fuel electrode layer 3, the surfaces of both arced faces m of the support body 1 and on the flat face n on the top side of the support body 1 devoid of the fuel electrode 3.

As described above, the solid electrolyte layer 4 preferably contains, as the primary component, partially stabilized or stabilized $ZrO_2$ in which a rare earth element such as Y, Sc, Yb or the like has formed a solid solution in an amount from 3 to 15 mol %. The rare earth element is preferably Y from the perspective or low cost. Of course, the solid electrolyte layer 4 is not limited to a ceramic containing partially stabilized or stabilized $ZrO_2$, and may be, for example, a conventional known ceria-based or lanthanum gallate-based solid electrolyte layer in which a rare earth element such as Gd, Sm or the like has formed a solid solution.

An intermediate layer 9 is formed between the solid electrolyte layer 4 and the oxygen electrode layer 6 to be described later with the objectives of strengthening the bond between the solid electrolyte layer 4 and the oxygen electrode layer 6 and suppressing formation of a reaction layer having high electric resistance by a reaction between the components of the solid electrolyte layer 4 and the components of the oxygen electrode layer 6.

The intermediate layer 9 is made of a $CeO_2$-based sintered body containing a rare earth element other than Ce, and preferably has a composition represented by, for example, $(CeO_2)_{1-x}(REO_{1.5})_x$ (in the formula, RE is at least one of Sm, Y, Yb, and Gd, and x is a number that satisfies $0 < x \leq 0.3$). Additionally, from the perspective of reducing electric resistance, RE is preferably Sm or Gd, and the intermediate layer 9 is preferably made of $CeO_2$ in which from 10 to 20 mol % of $SmO_{1.5}$ or $GdO_{1.5}$ has formed a solid solution. Furthermore, the intermediate layer 9 may have a two-layer structure.

The oxygen electrode layer 6 is preferably formed of an electrically conductive ceramic made of a so-called $ABO_3$ perovskite oxide. Examples of the perovskite oxide include a transition metal perovskite oxide containing La, and particularly preferably at least one of an $LaMnO_3$-based oxide, an $LaFeO_3$-based oxide, and an $LaCoO_3$-based oxide, in which Sr and La are copresent at the A site. An $LaCoO_3$-based oxide is particularly preferred from the perspective that electric conductivity at an actuation temperature of approximately 600 to 1000° C. is high. In the above perovskite oxide, Co together with Fe or Mn may be copresent at the B site.

The oxygen electrode layer 6 must be gas-permeable, and therefore, the electrically conductive ceramic (perovskite oxide) that forms the oxygen electrode layer 6 preferably has porosity of not less than 20%, and particularly preferably from 30 to 50%. The thickness of the oxygen electrode layer 6 is preferably from 30 to 100 μm from the perspective of current collection capability.

The interconnector layer 8 is formed of an electrically conductive ceramic. The interconnector layer 8 must have reduction resistance and oxidation resistance since the interconnector layer 8 contacts the fuel gas (hydrogen-containing gas) and the oxygen-containing gas. For this reason, for example, a lanthanum chromite-based perovskite oxide ($LaCrO_3$-based oxide) is used as the electrically conductive ceramic having reduction resistance and oxidation resistance, and in particular, an $LaCrMgO_3$-based oxide having Mg present at the B site is used with the objective of bringing the thermal expansion coefficient closer to those of the support body 1 and the solid electrolyte layer 4. The material of the interconnector layer 8 is not particularly limited provided that it is an electrically conductive ceramic.

The thickness of the interconnector layer 8 is preferably from 10 to 60 μm from the perspectives of gas leakage prevention and electric resistance. Within this range, leakage of gas can be prevented and electric resistance can be low.

Additionally, a cohesion layer (not illustrated) may be formed between the support body 1 and the interconnector layer 8 to reduce the difference in thermal expansion coefficients between the interconnector layer 8 and the support body 1.

The cohesion layer may have a composition similar to that of the fuel electrode layer 3. For example, it may be formed from at least one of a rare earth oxide, $ZrO_2$ in which a rare earth element has formed a solid solution, and $CeO_2$ in which a rare earth element has formed a solid solution, and Ni and/or NiO. More specifically, it may be, for example, a composition containing $Y_2O_3$ and Ni and/or NiO, a composition containing $ZrO_2$ (YSZ) in which Y has formed a solid solution and Ni and/or NiO, or a composition containing $CeO_2$ in which Y, Sm, Gd, or the like has formed a solid solution and Ni and/or NiO. The volume ratio of rare earth oxide or $ZrO_2(CeO_2)$ in which a rare earth element has formed a solid solution to Ni and/or NiO is preferably from 40:60 to 60:40.

In the fuel cells 100, 200, and 300 of the embodiments illustrated in FIGS. 1 and 2, a first layer 7 is provided in a region of the solid electrolyte layer 4. The region is devoid of the second electrode layer 6. The solid electrolyte layer 4 contains an oxide as a primary component. The oxide contains a rare earth element. The first layer 7 contains the oxide as the primary component with a content of the rare earth element. The content is different from a content of the rare earth element in the solid electrolyte layer 4. The oxide contained in the first layer 7 is same as the oxide which is contained in the solid electrolyte layer 4. The first layer 7 has a higher strength than the solid electrolyte layer 4. The materials that constitute the solid electrolyte layer 4 and the first layer 7 can be, for example, a zirconia-based oxide, a ceria-based oxide, a lanthanum gallate-based oxide, or the like.

Here, when the material that constitutes the solid electrolyte layer 4 has a primary component of, for example, $ZrO_2$ containing a rare earth element, it is preferred that the first layer 7 have a smaller content of rare earth element than the solid electrolyte layer 4. On the other hand, when the material that constitutes the solid electrolyte layer 4 has a primary component of, for example, $CeO_2$ containing a rare earth element, it is preferred that the first layer 7 have a larger content of rare earth element than the solid electrolyte layer 4. With such a configuration, the strength of the first layer 7 can be made higher than that of the solid electrolyte layer 4, and additionally, since the components of the first layer 7 are similar to those of the solid electrolyte layer 4, the bonding strength between the solid electrolyte layer 4 and the first layer 7 can be increased. Here, a primary component means a component accounting for not less than 90 volume % of the elements that constitute the solid electrolyte layer 4 or the first layer 7.

Which of the solid electrolyte layer 4 or the first layer 7 has higher strength may be determined using a microhardness gauge, for example, by pressing an indenter under the same load into a portion where the solid electrolyte layer 4 and the first layer 7 are exposed in a fuel cell 300 that has been broken and mirror-finished, and measuring the maximum indentation depth at that time.

From the perspective of improving power generation performance, it is particularly desirable that the solid electrolyte layer 4 have a primary component of partially stabilized zirconia, for example, $ZrO_2$ in which from 7 to 9 mol % of $Y_2O_3$ has formed a solid solution. It is also desirable that the first layer 7 have a primary component of, for example, $ZrO_2$ in which from 3 to 5 mol % of $Y_2O_3$ has formed a solid solution, as the content of the rare earth element.

Furthermore, the fuel cells 100, 200, and 300 of the embodiments illustrated in FIGS. 1 and 2 are examples in which the first layer 7 is provided on the surface of the solid electrolyte layer 4 in a region devoid of the second electrode layer 6 on one end portion of each of the fuel cells, but the location where the first layer 7 is provided is not limited thereto. Specifically, the first layer 7 may be provided on a portion of the solid electrolyte layer 4 devoid of the oxygen electrode layer 6, and therefore, it may be provided, for example, between the support body 1 and the solid electrolyte layer 4, or between the fuel electrode layer 3 and the solid electrolyte layer 4.

The first layer 7 will be described below using the hollow plate fuel cell 300 illustrated in FIGS. 2A to 2C. In the description below, the first layer 7 is described as being provided on the exposed solid electrolyte layer 4 unless otherwise noted.

In the fuel cell 300 illustrated in FIG. 3A, the region of the solid electrolyte layer 4 devoid of the oxygen electrode layer 6 is on one end portion (lower end portion) of the fuel cell 300, and the first layer 7c is provided in this region. One end of the first layer 7c is provided up to the lower end portion of the fuel cell 300. The lower end portion of the fuel cell 300, as will be described later, is the base portion bonded to the gas tank, and at the upper end portion, fuel gas is released from the opened fuel gas passages 2. As a result, the base portion of the fuel cell 300 may be strengthened, and cracking and the like can be suppressed.

FIG. 3A illustrates an example in which the first layer 7c is provided so as not to overlap the oxygen electrode layer 6. The first layer 7c and the oxygen electrode layer 6 may also be provided so as to overlap each other. Specifically, in the present embodiment, the first layer 7 may be provided in a region of the solid electrolyte layer 4 devoid of the oxygen electrode layer 6, or a portion of the first layer 7 may be provided in the region where the oxygen electrode 6 is provided. However, because the first layer 7c has lower power generation performance than the solid electrolyte layer 4, it is preferable that the first layer 7c is provided so as not to overlap the oxygen electrode layer 6 in order to generate power more efficiently.

When the first layer 7 and the oxygen electrode layer 6 are provided so as to overlap each other, it is desirable that an intermediate layer 9 be formed therebetween to prevent a mutual reaction between the first layer 7c and the oxygen electrode layer 6.

Here, the width of the first layer 7 (length in the width direction W of the fuel cell 300) may be set as appropriate, but may be, for example, the same as the width of the flat faces n of the support body 1. On the other hand, depending on the length of the fuel cell 300, the length of the first layer 7 may be approximately 3 to 10% of the length of the support body 1 from the perspective of improving the strength of the fuel cell while assuring the power generation area.

The thickness of the first layer 7 is preferably greater than the thickness of the solid electrolyte layer 4 from the perspective of further improving the strength. Hence, the thickness of the first layer 7 may be, for example, from 30 to 100 μm, whereas the thickness of the solid electrolyte layer 4 is not greater than 30 μm.

In the fuel cell 300 described above, because the thickness of the solid electrolyte layer 4 is as thin as 30 μm or less, the power generation performance can be improved, and further, even if the fuel cell 300 tends to be deformed, deformation of the fuel cell 300 can be suppressed by the first layer 7 and cracking in the fuel cell can be prevented. As a result, a fuel cell 300 having high power generation performance and high long-term reliability can be provided.

Specifically, since the conductive support body 1 having a high Ni content expands and contracts to a greater degree when exposed to a reducing atmosphere, large stress acts on the solid electrolyte layer 4 when the fuel cell 300 is exposed to a reducing atmosphere. Also, when the lower end portion is affixed to the gas tank to be described later by a heat-resistant sealing material or the like, large stress acts on the solid electrolyte layer 4 accompanying expansion and contraction of the sealing material. As a result, there is risk of cracking in the thin solid electrolyte layer 4 due to these stresses, but since the fuel cell 300 of the present embodiment contains a first layer 7, the solid electrolyte layer 4 can be reinforced and cracking in the fuel cell 300 can be suppressed.

FIG. 3B illustrates an example in which the portion of the solid electrolyte layer 4 devoid of the oxygen electrode layer 6 is provided along the longitudinal direction L of the support body 1, and in this region, the first layer 7 is provided extending along the longitudinal direction L of the support body 1. Furthermore, FIG. 3B illustrates an example in which the first layer 7 is provided in two rod shapes along the longitudinal direction L of the fuel cell 300 respectively on the two sides in the width direction W of the support body 1. The upper end in the longitudinal direction L of the first layer 7 is positioned at a specified distance from the upper end of the support body 1, and the lower end is positioned at the lower end of the support body 1, and the first layer 7 is not formed along the entire longitudinal direction L.

In the fuel cell 300 of the present embodiment, a covering layer (not illustrated) is formed between the upper end in the longitudinal direction L of the first layer 7 and the upper end of the support body 1 and on the upper end face of the support body 1. This covering layer mitigates the adverse effects of combustion of fuel gas released from the fuel gas passages 2. The covering layer may be configured from cordierite, steatite, forsterite, mullite, alumina, zirconia, or the like. The covering layer between the upper end in the longitudinal direction L of the first layer 7 and the upper end of the support body 1 is formed on top of the solid electrolyte layer 4.

The oxygen electrode layer 6 is positioned between the two first layers 7 provided respectively on the two sides in the width direction W of the support body 1. As a result, sufficient area of the oxygen electrode layer 6 can be assured. The oxygen electrode layer 6 may also cover a portion of the top face of the first layer 7. When a portion of the top face of the first layer 7 is covered by the oxygen electrode layer 6, it is desirable that an intermediate layer 9 be formed therebetween to prevent a mutual reaction between a portion of the first layer 7 and the oxygen electrode layer 6.

In the example illustrated in FIG. 3B, depending on the width of the fuel cell 300, the width of the first layer 7 (length in the width direction W of the fuel cell 300) is, for example, from 1.0 to 3.0 mm, and is set such that the power generation area is as large as possible. The thickness of the first layer 7 can be thicker in the middle portion in the longitudinal direction L of the fuel cell 300 than at the two end portions. High stress tends to occur on the middle portion in the longitudinal direction L of the fuel cell 300, but the middle portion can be reinforced by making the thickness of the first layer 7 greater in the middle portion in the longitudinal direction L than in the two end portions.

On the other hand, as will be described later, the lower end portion of the fuel cell 300 serves as a base portion bonded to the gas tank 16, and large stress sometimes occurs on the lower end portion. In this case, the lower end portion side of the fuel cell 300 can be reinforced by making the thickness on the lower end portion side in the first layer 7 thicker than in the other areas.

In FIG. 3C, two first layers 7a are disposed respectively on the two sides in the width direction W of one main face side of the support body 1 as illustrated in FIG. 3B, and another first layer 7b is disposed between them. Specifically, the first layer 7 is also provided in a region of the solid electrolyte layer 4 where the oxygen electrode 6 is provided in addition to the region of the solid electrolyte layer 4 devoid of the oxygen electrode layer 6. Specifically, the oxygen electrode layer 6 is disposed between the two first layers 7a, and covers the first layer 7b. The oxygen electrode layer 6 is also provided on the top face of the first layer 7b with the intermediate layer 9 interposed, serving to generate power in this portion as well. In such a fuel cell 300, power generation performance can be fully demonstrated, and, due to the first layers 7a and 7b, a cracking suppression effect can also be fully demonstrated in the fuel cell 300.

Furthermore, when the solid electrolyte layer 4 has a primary component of, for example, $ZrO_2$ in which a rare earth element has formed a solid solution, it is desirable from the perspective of improving power generation performance that the content of the rare earth element in the first layer 7b be greater than in the first layer 7a and less than in the solid electrolyte layer 4. In this case, in the portion where the first layer 7b is formed, the solid electrolyte layer 4 may be thick.

In the fuel cell 300 described above, the solid electrolyte layer 4 can be further reinforced by the first layer 7b, and cracking in the fuel cell 300 can be suppressed.

In FIG. 3D, the temperature is low in the lower end portion (fuel upstream portion) in the longitudinal direction L of the fuel cell 300, and the fuel concentration is low in the upper end portion. Therefore, the power generation quantity in these portions tends to be smaller, and therefore, the width is made gradually larger toward the two ends in the longitudinal direction of the first layer 7a. In such a fuel cell 300, power generation performance can be fully demonstrated, and, due to the first layer 7a, a cracking suppression effect can also be fully demonstrated in the fuel cell 300.

In FIG. 3E, the temperature tends to be low and the power generation quantity tends to be low in the lower end portion in the longitudinal direction L of the fuel cell 300. Therefore, three first layers 7c are provided at prescribed intervals between the lower end portions in the longitudinal direction L of the two first layers 7a. With such a fuel cell 300, power generation performance can be fully demonstrated, and, due to the first layers 7a and 7c, a cracking suppression effect can also be fully demonstrated in the fuel cell 300. Additionally, as will be described later, when the lower end portion of the fuel cell 300 is bonded to a gas tank, the lower end portion of the fuel cell 300 can be reinforced and cracking can be suppressed. Furthermore, when the solid electrolyte layer 4 has a primary component of, for example, $ZrO_2$ in which a rare earth element has formed a solid solution, it is desirable from the perspective of reinforcing the lower end portion of the fuel cell 300 that the content of the rare earth element in the first layer 7c be greater than in the first layer 7a and less than in the solid electrolyte layer 4.

In FIG. 3F, the temperature tends to be low and the power generation quantity tends to be low in the lower end portion in the longitudinal direction L of the fuel cell 300. Therefore, a first layer 7c is provided so as to mutually connect the lower end portions in the longitudinal direction L of the two first layers 7a. With such a fuel cell 300, power generation performance can be fully demonstrated, and, due to the first layers 7a and 7c, a cracking suppression effect can also be fully demonstrated in the fuel cell 300. Additionally, as will be described later, when the lower end portion of the fuel cell 300 is bonded and affixed to a gas tank, the lower end portion of the fuel cell 300 can be reinforced and cracking can be suppressed. Furthermore, in this case, similar to FIG. 3A, the width of the first layer 7c (length in the width direction W of the fuel cell 300) may be, for example, the same as the width of the flat faces n of the support body 1.

In FIG. 3G, the temperature is low on the lower end portion (fuel upstream portion) in the longitudinal direction L of the fuel cell 300, and the fuel concentration is low in the upper end portion (fuel downstream portion). Therefore, the power generation quantity in these portions tends to be smaller, and therefore, the first layer 7c is provided so as to mutually connect the two end portions in the longitudinal direction L of the two first layers 7a. On the upper end portion of the fuel cell 300, the oxygen electrode layer 6 is not provided on the solid electrolyte layer 4, and the first layer 7c is provided in this region. With such a fuel cell 300, power generation performance can be fully demonstrated, and, due to the first layers 7a and 7c, a cracking suppression effect can also be fully demonstrated in the fuel cell 300. Additionally, as will be described later, when the lower end portion of the fuel cell 300 is bonded and affixed to a gas tank, the lower end portion of the fuel cell 300 can be reinforced and cracking can be suppressed, and also, the upper end portion of the fuel cell 300 can be reinforced when the fuel gas released from the upper end of the fuel cell 300 combusts. Furthermore, in this case, similar to FIG. 3A, the width of the first layer 7c (length in the width direction W of the fuel cell 300) may be, for example, the same as the width of the flat faces n of the support body 1.

Figure 4A:
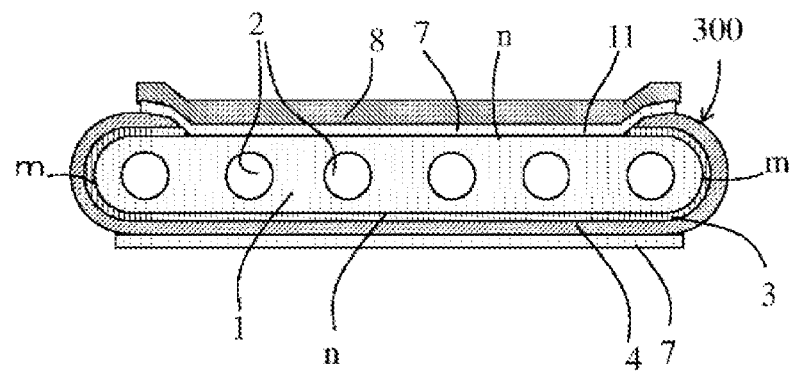
FIGS. 4A and 4B illustrate a hollow plate solid oxide fuel cell in which a first layer is provided on a main face on one side of a support body and a second layer is provided on a main face on the other side.
Figure 4B:
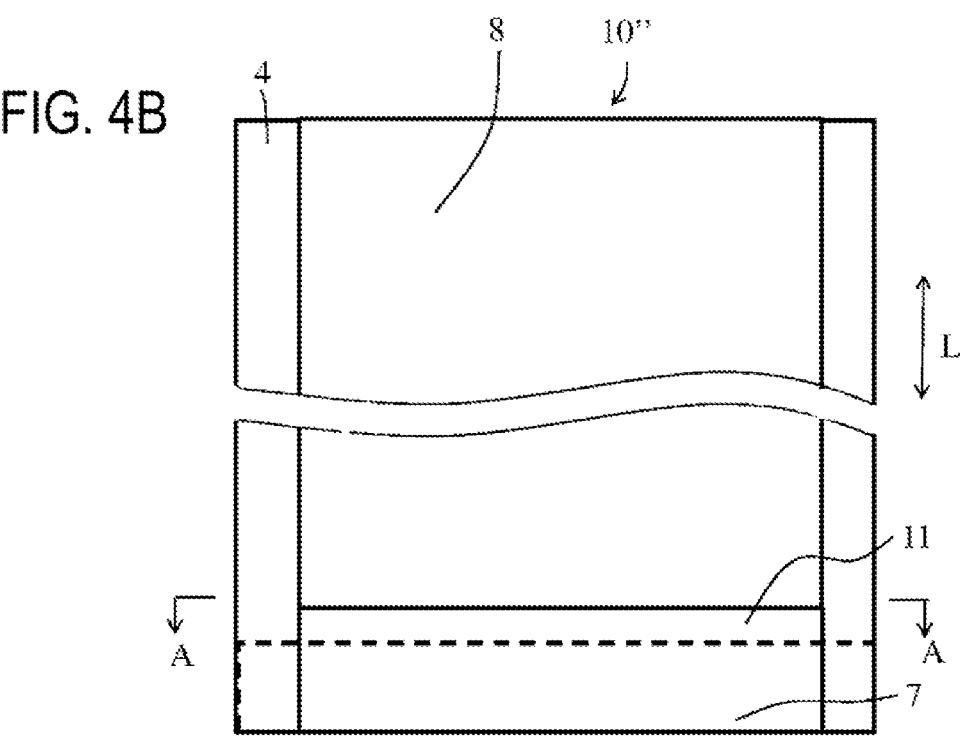

FIGS. 4A and 4B illustrate a fuel cell 300 in which a first layer 7 is provided on the main face on one side of the support body 1. A second layer 11 is provided on the main face on the other side of the support body 1. The second layer 11 contains the oxide as the primary component with a content of the rare earth element. The content is different from a content of the rare earth element in the solid electrolyte layer 4. The oxide contained in the second layer 11 is same as the oxide which is contained in the solid electrolyte layer 4. The second layer 11 has a higher strength than the solid electrolyte layer 4. Furthermore, the second layer 11 may be produced from the same material as the first layer 7. FIGS. 4A and 4B illustrate a fuel cell 300 in which the second layer 11 is provided in the mode illustrated in FIGS. 2A to 2C, FIG. 4A is a cross-sectional view along line A-A of FIG. 4B.

In this mode, the second layer 11 is provided on the lower end portion (base portion) of the main face on the other side of the support body 1, and the lower end of the second layer 11 is positioned at the lower end of the support body 1, and the top end portion of the second layer 11 is covered by the interconnector layer 8. In other words, the lower end portion of the interconnector layer 8 covers both end portions of the solid electrolyte layer 4 and the top end portion of the second layer 11, and the other portions thereof cover the support body 1, and the second layer 11 is provided between the interconnector layer 8 and the support body 1. The width of the second layer 11 is substantially the same as the width of the interconnector layer 8, and the two end portions in the width direction W of the second layer 11 are formed on top of the two end portions of the solid electrolyte layer 4. Furthermore, the width of the second layer 7 may be, for example, the same as the width of the flat faces n of the support body 1. Additionally, the interconnector layer 8 may be provided such that it covers the entirety of the second layer 11 or such that it does not cover the lower end of the second layer 11.

The thickness of the second layer 11 is preferably greater than the thickness of the solid electrolyte layer 4 from the perspective of improving the strength. Hence, the thickness of the second layer 11 may be, for example, from 30 to 100 μm, similar to the first layer 7, whereas the thickness of the solid electrolyte layer 4 is not greater than 30 μm.

With such a fuel cell 300, the lower end portion of the fuel cell 300 can be further reinforced than in the mode of FIGS. 2A to 2C, and cracking can be suppressed.

When providing the second layer 11 in the lower end portion of the support body 1, the cohesion layer that can be provided between the interconnector layer 8 and the support body 1 may also be provided between the support body 1 and the second layer 11 for the purpose of improving bonding strength between the support body 1 and the second layer 11. By so doing, the bonding strength between the support body 1 and the second layer 11 can be increased.

Additionally, when there is a first layer 7c on the lower end portion of the main face on one side of the support body 1, when this first layer 7c and the second layer 11 provided on the lower end portion of the main face on the other side of the support body 1 are compared, the length of the first layer 7c in the longitudinal direction L of the support body 1 can be made shorter than the length of the second layer 11 in the longitudinal direction L of the support body 1.

By reducing the length of the first layer 7c in the longitudinal direction L of the support body 1, a large power generation area can be ensured, a reduction in power generation performance can be suppressed, and the lower end portion of the support body 1 can be strengthened by the first layer 7c and the second layer 11 which is longer than the first layer 7c in the longitudinal direction L of the support body 1. In this case, the first layer 7 and the second layer 11 preferably have the same width or thickness in the width direction W of the support body 1.

FIGS. 5A to 5C illustrate an example of the interconnector layer 8 and second layer 11. In FIG. 5A, the interconnector layer 8 is formed from the upper end to the lower end of the support body 1, and this interconnector layer 8 covers the entire second layer 11 formed on the lower end portion of the support body 1. FIG. 5B illustrates a mode in which the interconnector layer 8 is not formed on the upper end portion of the support body 1, and a portion of the second layer 11 on the lower end portion of the support body 1 is not covered by the interconnector layer 8. In this case, the upper end portion of the support body 1 can be covered by the covering layer described above. FIG. 5C illustrates a mode in which the interconnector layer 8 is formed up to the upper end portion of the support body 1, and a portion of the second layer 11 on the lower end portion of the support body 1 is not covered by the interconnector layer 8. The same actions and effects as FIGS. 4A and 4B can be obtained by such a fuel cell as well. Of course, a second layer 11 may also be provided in each of the modes that include first layers 7a, 7b, and 7c of FIGS. 3A to 3G.

An example of the method for producing the fuel cell 300 of the present embodiment described above will be described.

First, for example, Ni and/or NiO powder, powder of a rare earth element such as $Y_2O_3$, an organic binder, and a solvent are mixed to prepare a green body. A support body compact is produced by extrusion molding using this green body, and it is dried. Furthermore, a calcined body obtained by calcining the support body compact for 2 to 6 hours at 900 to 1000° C. may also be used as the support body compact.

Next, for example, raw materials of NiO and $ZrO_2$ (YSZ) in which $Y_2O_3$ has formed a solid solution are weighed and mixed according to a prescribed compounding composition. After that, an organic binder and a solvent are mixed with the mixed powder to prepare a slurry for the fuel electrode layer.

Then, toluene, binder powder (for example, acrylic resin, which is a higher polymer than the binder powder adhered to the $ZrO_2$ powder), and a commercially available dispersing aid are added to the $ZrO_2$ powder in which a rare earth element has formed a solid solution, thereby making a slurry, and this slurry is molded by a method such as the doctor blade method to create a sheet-like solid electrolyte layer compact.

The fuel electrode layer slurry is applied on the obtained sheet-like solid electrolyte layer compact and then dried to form a fuel electrode layer compact, and a sheet-like laminated compact is thereby formed. The face on the fuel electrode layer compact side of the sheet-like laminated compact on which the fuel electrode layer compact and the solid electrolyte layer compact have been laminated is laminated on the electrically conductive support body compact, forming a compact.

Then, the laminated compact is calcined at 800 to 1200° C. for 2 to 6 hours. After that, on the solid electrolyte compact (calcined body), a slurry for the first layer is produced using $ZrO_2$ powder having a lower rare earth element solid solution content than the above solid electrolyte layer compact slurry, binder powder, and the like, and this slurry is applied in the shapes illustrated in FIGS. 3A to 3G, and dried.

Furthermore, when forming a second layer 11 on the main face on the other side of the support body 1, for example, the first layer slurry is applied on a portion of the support body compact on which the solid electrolyte compact has not been formed in the shapes illustrated in FIGS. 5A to 5C, and dried to produce a second layer compact.

Then, an interconnector layer material (for example, $LaCrMgO_3$-based oxide powder), an organic binder, and a solvent are mixed to produce a slurry. The subsequent process will be described for the case of producing a fuel cell having a cohesion layer.

Next, when a cohesion layer compact is formed between the support body 1 and the interconnector layer 8, it is produced as follows. For example, $ZrO_2$ in which Y has formed a solid solution and NiO are mixed to result in a volume ratio of 40:60 to 60:40 and then dried, an organic binder and the like are added to prepare a slurry for the cohesion layer, and this is applied on the support body compact between the two end portions of the solid electrolyte layer compact to form a cohesion layer compact. The slurry for the interconnector layer is applied on this cohesion layer compact. Furthermore, similar to the case where the cohesion layer is provided between the support body 1 and the second layer 11, the above cohesion layer slurry may be applied on the second layer compact.

Then, an intermediate layer to be disposed between the solid electrolyte layer 4 and the oxygen electrode layer 6 is formed. For example, $CeO_2$ powder in which $GdO_{1.5}$ has formed a solid solution is thermally treated for 2 to 6 hours at 800 to 900° C., and the raw material powder for the intermediate layer compact is prepared. Toluene is added as a solvent to this raw material powder, and a slurry for an intermediate layer is produced, and this slurry is applied on the solid electrolyte layer compact and on the first layer compact to produce an intermediate layer compact.

After that, the interconnector layer slurry is applied on both end portions of the solid electrolyte compact (calcined body) such that both end portions of the interconnector layer compact are laminated, and a laminated compact is produced. Furthermore, it is also possible to produce a laminated compact by preparing the interconnector layer slurry and producing a sheet for the interconnector layer, and laminating the sheet for the interconnector layer on both end portions of the solid electrolyte compact such that the two end portions of the sheet for the interconnector layer are laminated. Furthermore, when a second layer compact has been formed, the sheet for the interconnector layer is laminated so as to cover the upper end portion or the entirety of the second layer compact.

Then, a binder removal treatment is performed on the laminated compact, and simultaneous sintering (simultaneous firing) is performed at 1400 to 1450° C. for 2 to 6 hours in an oxygen-containing atmosphere.

Additionally, a slurry containing material for the oxygen electrode layer (for example, $LaCoO_3$-based oxide powder), a solvent, and a pore forming agent is applied on the intermediate layer by dipping or the like, and by then baking for 2 to 6 hours at 1000 to 1300° C., a fuel cell 300 of the present embodiment having the structure illustrated in FIGS. 2A to 2C can be produced.

Figure 6A:
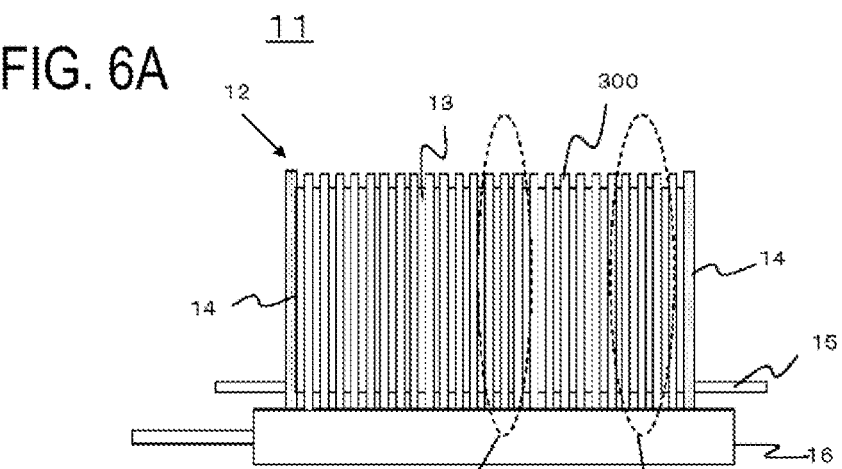
FIGS. 6A and 6B illustrate an example of a cell stack device.
Figure 6B:
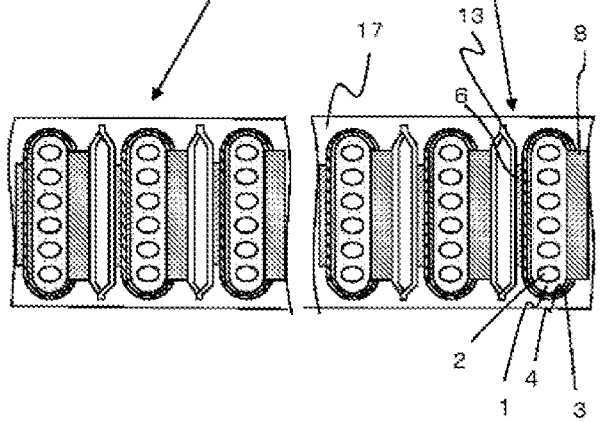

FIGS. 6A and 6B illustrate an example of a cell stack device configured by electrically connecting a plurality of the above-described fuel cells 300 in series; FIG. 6A is a side view schematically illustrating the cell stack device; and FIG. 6B is an enlarged cross-sectional view of a portion of the cell stack of FIG. 6A surrounded by dotted lines. In FIG. 6B, the portion corresponding to the portion surrounded by dotted lines illustrated in FIG. 6A is indicated by an arrow to make it obvious, and in the fuel cell 300 illustrated in FIG. 6B, some of the members of the intermediate layer 9 and the like described above are omitted.

Furthermore, in the cell stack device, a cell stack 12 is configured by arranging each of the fuel cells 300 with electrically conductive members 13 interposed therebetween, and the lower end portion of each of the fuel cells 300 is affixed by an insulating bonding material 17 such as a glass sealant to a gas tank 16 for supplying fuel gas to the fuel cells 300. Also, the cell stack 12 is sandwiched from both ends in the arrangement direction of the fuel cells 300 by an elastically deformable end portion electrically conductive member 14 whose lower end portions are affixed to the gas tank 16.

Additionally, in the end portion electrically conductive member 14 illustrated in FIGS. 6A and 6B, a current drawing portion 15 for drawing current produced by the power generation of the cell stack 12 (fuel cells 300) is provided in a shape that extends outward along the arrangement direction of the fuel cells 300.

FIG. 7 illustrates affixation structures of the fuel cell 300 to the gas tank 16. The lower end portion of the fuel cell 300 is inserted into an opening portion formed on the top face of the gas tank 16, and is affixed by a bonding material 17 such as a glass sealant.

FIG. 7A illustrates an example in which a fuel cell 300 of the type illustrated in FIG. 3A has been affixed to the gas tank 16. In FIG. 7A, the lower end portion of the first layer 7c is embedded in the bonding material 17 such as a glass sealant, and as a result, the portion of the fuel cell 300 bonded by the bonding material 17 can be reinforced and the lower end portion of the fuel cell 300 can be reinforced. Here, in addition to reduction expansion and contraction of the support body 1, stress occurs on the lower end portion of the fuel cell 300 due to differences in the materials that constitute the gas tank 16, fuel cell 300, and first bonding material 17, and there is risk of cracking and the like, but since the lower end portion of the first layer 7 is embedded in the bonding material 17, cracking on the lower end portion of the fuel cell 300 is suppressed.

In the fuel cell 300, high stress tends to occur at the boundary between the portion where the bonding material 17 is present and the portion where it is not present, but since the upper end portion of the first layer 7c is exposed from the bonding material 17, the boundary portion in the fuel cell 300 can be reinforced. The length of the first layer 7c exposed from the bonding material 17 may be set as appropriate, but, for example, from 2 to 10 mm is desirable. The same is true in the other embodiments described below.

FIG. 7B illustrates an example in which a fuel cell 300 of the type illustrated in FIG. 3B has been affixed to the gas tank 16. In FIG. 7B as well, the lower end portion of the first layer 7c is embedded in the bonding material 17 such as a glass sealant, and as a result, the portion of the fuel cell 300 bonded by the bonding material 17 can be reinforced and the lower end portion of the fuel cell 300 can be reinforced.

FIG. 7C illustrates an example in which a fuel cell 300 of the type illustrated in FIG. 3E has been affixed to the gas tank 16. Specifically, on the lower end portion of two first layers 7a, three first layers 7c are formed with a prescribed spacing. A portion of the first layer 7c is bonded by the bonding material 17 such as a glass sealant, and the upper end portion of the first layer 7c is exposed from the bonding material 17. In such a cell stack device, cracking can be further suppressed on the lower end portion of the fuel cell 300. The three first layers 7c may also be discontinuous above the boundary line of the portion where the bonding material 17 is present and the portion where it is not present, and it is desirable if the first layers 7c are exposed in not less than 30% of the portion in the width direction.

FIG. 7D illustrates an example in which a fuel cell 300 of the type illustrated in FIG. 3F has been affixed to the gas tank 16. Specifically, the lower end portions of two first layers 7a are connected to each other by the first layer 7c, and a portion of the first layer 7c is bonded by the bonding material 17 such as a glass sealant, and the upper end portion of the first layer 7c is exposed from the bonding material 17. In such a cell stack device, cracking is further suppressed on the lower end portion of the fuel cell 300.

FIG. 7E illustrates an example in which a fuel cell 300 of the type illustrated in FIG. 3G has been affixed to the gas tank 16. Specifically, both the upper and lower end portions of two first layers 7a are connected to each other by the first layer 7c, and a portion of the first layer 7c on the bottom side is bonded by the bonding material 17 such as a glass sealant. With such a cell stack device, cracking can be further suppressed on the lower end portion of the fuel cell. The fuel cell 300 can be reinforced by the first layer 7c of the upper end portion when combustion is performed above the fuel cell 300.

FIG. 8 illustrates affixation structures of the fuel cell 300 to the gas tank 16 for the interconnector layer side; FIGS. 8A to 8C illustrate the case where the fuel cells of FIGS. 5A to 5C are bonded to the gas tank 16.

Similar to the case described above, cracking can be further suppressed on the lower end portion of the fuel cell in this case as well. Here, in the cell stack device of the present embodiment, by configuring a cell stack 12 using the fuel cells 300 described above, it is possible to make a cell stack device having high power generation performance and improved long-term reliability.

FIG. 9 is an exterior perspective view of an example of a fuel cell module 18, in which a cell stack device is housed in a housing container, configured such that the cell stack device illustrated in FIGS. 6A and 6B is housed on the interior of a cuboid housing container 19.

To obtain the fuel gas used by the fuel cell 300, a reformer 20 for reforming raw fuel such as natural gas or kerosene and producing fuel gas is disposed above the cell stack 12. The fuel gas produced by the reformer 20 is supplied via a gas distribution pipe 21 to the gas tank 16, and is supplied via the gas tank 16 to a fuel gas passage 2 provided on the interior of the fuel cell 300.

Furthermore, FIG. 9 illustrates a state in which portions (the front and rear faces) of the housing container 19 have been removed and the cell stack device housed on the interior and the reformer 20 have been taken out to a rear side. In the fuel cell module 18 illustrated in FIG. 9, the cell stack device can be housed by sliding it inside the housing container 19. The cell stack device may also contain the reformer 20.

In FIG. 9, an oxygen-containing gas introduction member 22 provided on the interior of the housing container 19 is disposed between a pair of cell stacks 12 placed juxtaposed with the gas tank 16, and it supplies oxygen-containing gas to the lower end portion of the fuel cell 300 such that the oxygen-containing gas flows from the lower end portion toward the upper end portion on the side of the fuel cell 300 in accordance with the flow of fuel gas. The temperature of the fuel cell 300 can be increased and the activation of the cell stack device can be quickened by combusting the fuel gas discharged from the fuel gas passage 2 of the fuel cell 300 on the upper end portion of the fuel cell 300 by reacting it with oxygen-containing gas. Furthermore, the reformer 20 disposed above the fuel cell 300 (cell stack 12) can be warmed by combusting the fuel gas discharged from the fuel gas passage 2 of the fuel cell 300 and the oxygen-containing gas on the upper end portion of the fuel cell 300. As a result, the reforming reaction can be efficiently carried out by the reformer 20.

Additionally, in the fuel cell module 18 of the present embodiment, because the above-described cell stack device that uses the fuel cells 300 is housed inside the housing container 19, a fuel cell module 18 with high power generation performance and improved long-term reliability can be obtained.

FIG. 10 is a perspective view illustrating an example of a fuel cell device which is a module housing device which houses the fuel cell module 18 illustrated in FIG. 9 and auxiliary devices for operating the cell stack device inside an exterior case. Note that a portion of the structure is omitted in FIG. 10.

The fuel cell device 23 illustrated in FIG. 10 is configured such that the interior of the exterior case, which is configured from a support column 24 and an exterior plate 25, is segmented top and bottom by a partition plate 26, wherein the upper side thereof serves as a module housing chamber 27 which houses the fuel cell module 18 described above, and the lower side serves as an auxiliary device housing chamber 28 which houses auxiliary devices for operating the fuel cell module 18. Note that the auxiliary devices housed in the auxiliary device housing chamber 28 are omitted in the drawing.

An air flow opening 29 is provided in the partition plate 26 to allow the air in the auxiliary housing chamber 28 to flow to the module housing chamber 27 side, and an exhaust opening 30 is provided in a portion of the exterior plate 25 that constitutes the module housing chamber 27 to exhaust the air in the module housing chamber 27.

In such a fuel cell device 23, by housing a fuel cell module 18 with high power generation performance and improved reliability in a module housing chamber 27 as described above, a fuel cell device 23 having high power generation performance and improved reliability can be obtained.

Furthermore, other than the examples described above, the fuel cell may include, for example, an oxygen electrode 6, a solid electrolyte layer 4, and a fuel electrode 3 disposed on a support body.

In the above mode, a fuel cell, a cell stack device, a fuel cell module, and a fuel cell device were described, but the present invention is not limited thereto, and may also be applied to a cell (electrolytic cell, SOEC) that produces hydrogen and oxygen ($O_2$) by steam and voltage being provided to the cell and the cell electrolyzing the steam (water), and to a module and a module housing device that contain this cell.

WORKING EXAMPLE 1

First, NiO powder having an average particle diameter of 0.5 μm and $Y_2O_3$ powder having an average particle diameter of 0.9 μm were mixed, and a green body produced with an organic binder and a solvent was molded by extrusion molding, and it was dried and degreased to produce an electrically conductive support body compact. In the support body compact, the volume ratio after reduction was 48 volume % NiO and 52 volume % $Y_2O_3$.

Then, a sheet for the solid electrolyte layer was produced by the doctor blade method using a slurry obtained by mixing a binder powder and a solvent with $ZrO_2$ powder (solid electrolyte layer raw material powder), having a particle diameter of 0.8 μm according to the microtrack method, in which 8 mol % of $Y_2O_3$ had formed a solid solution.

A slurry for forming an intermediate layer compact was produced by grinding a composite oxide containing 90 mol % of $CeO_2$ and 10 mol % of rare earth element oxide ($GdO_{1.5}$, $SmO_{1.5}$) by vibration milling or ball milling using isopropyl alcohol (IPA) as a solvent, then performing calcining treatment for 4 hours at 900° C., again performing grinding treatment by ball milling, adjusting the degree of aggregation of the ceramic particles, and then adding a binder and a solvent to this powder and mixing.

Next, a slurry for a fuel electrode layer was prepared by mixing NiO powder having an average particle diameter of 0.5 μm, $ZrO_2$ powder in which $Y_2O_3$ had formed a solid solution, an organic binder, and a solvent, and this was applied by the screen printing method on the sheet for the solid electrolyte layer, and dried to form a fuel electrode layer compact.

The sheet-like laminated compact, in which the fuel electrode layer compact was formed on the sheet for the solid electrolyte layer, was laminated at a prescribed location on the support body compact, with the face thereof on the fuel electrode layer compact side facing inward.

Then, the laminated compact in which the above compacts were laminated was calcined for 3 hours at 1000° C. The slurry constituting the first layer was applied to the calcined body of solid electrolyte in the shape illustrated in FIG. 3F and dried. The slurry constituting the first layer is a slurry containing, for example, $ZrO_2$ powder having an average particle diameter of 0.8 μm in which 4 mol % of $Y_2O_3$ has formed a solid solution.

After that, the slurry that forms the intermediate layer compact was applied on the top face of the solid electrolyte calcined body and the top face of the first layer compact by the screen printing method and dried to form an intermediate layer compact.

Then, a slurry for the interconnector layer was produced by mixing $La(Mg_{0.3}Cr_{0.7})_{0.96}O_3$ having an average particle diameter of 0.7 μm, an organic binder, and a solvent. The prepared interconnector layer slurry was applied on a region of the support body devoid of the fuel electrode layer (and solid electrolyte layer) (the region where the support body was exposed).

Then, a binder removal treatment was performed on the laminated compact, and simultaneous firing was performed at 1450° C. for 2 hours in an oxygen-containing atmosphere.

Next, a mixture liquid containing $La_{0.6}Sr_{0.4}CO_{0.2}Fe_{0.8}O_3$ powder having an average particle diameter of 2 μm and isopropyl alcohol was prepared and spray coated on the surface of the intermediate layer at the top face of the first layer and on the top face of the solid electrolyte, to form an oxygen electrode layer compact. This was baked for 4 hours at 1100° C. to form an oxygen electrode layer, and a fuel cell having first layers 7a and 7c illustrated in FIG. 3F was produced.

The dimensions of the produced fuel cell were 25 mm×200 mm, the thickness of the support body (thickness between flat faces n) was 2 mm with porosity of 35%, the thickness of the fuel electrode layer was 10 μm with porosity of 24%, the thickness of the solid electrolyte layer was 20 μm, the thickness of the oxygen electrode layer was 50 μm with porosity of 40%, and the thickness of the interconnector layer was 40 μm. The thickness of first layers 7a and 7c was 80 μm. A fuel cell having a solid electrolyte layer thickness of 30 μm was also produced.

As illustrated in FIG. 7, the lower end portion of a cell stack in which seven of the produced fuel cells 300 were electrically connected via a current collecting member was inserted into the opening of a gas tank and affixed by bonding with a bonding material 17 containing crystallized glass, to produce a cell stack device. In this case, the upper end portion of the first layer 7c in which the lower end portions of the two parallel first layers 7a were connected to each other was exposed for a length of 5 mm upward from the bonding material 17 end.

On the other hand, as a comparative example, a cell stack was configured using seven fuel cells in which the first layer 7 was not formed, and a cell stack device was produced in the same manner as above.

Hydrogen gas was supplied inside the gas tank of these cell stack devices and allowed to flow into the interior of the fuel cells, and reducing treatment of the support bodies and fuel electrode layers was performed for 10 hours at 850° C., and then they were cooled.

Then, when it was visually checked whether or not cracking had occurred in the middle portion and the lower end portion of the fuel cell, it was found that cracking did not occur in the fuel cells having a first layer when the solid electrolyte layer thickness was 30 μm or 20 μm, but in the fuel cells lacking a first layer, cracking was seen in the lower end portion (portion exposed from the bonding material) in five of the seven fuel cells when the solid electrolyte layer thickness was 20 μm, and cracking was seen in the lower end portion (portion exposed from the bonding material) in one of the seven fuel cells when the solid electrolyte layer thickness was 30 μm.

From these results, it is understood that cracking in the fuel cell can be prevented by including a first layer even if the solid electrolyte layer is as thin as 30 μm or less.

WORKING EXAMPLE 2

A cell having the first layer of the above Working Example 1 and also having the second layer illustrated in FIG. 5B was produced. For the second layer, after the first layer slurry was applied, the same slurry as the slurry constituting the first layer was applied at the locations illustrated in FIG. 5B (on the support body compact and on the solid electrolyte layer compact), and, similarly to Working Example 1, the intermediate layer compact was formed, and then an interconnector layer slurry was applied, and after simultaneous firing, an oxygen electrode layer was formed.

After that, when evaluated in the same manner as Working Example 1, cracking did not occur in the fuel cells having a first layer and a second layer when the solid electrolyte layer thickness was either 30 μm or 20 μm.

REFERENCE NUMBERS

1: Support body
2: Fuel gas passage
3: First electrode layer (fuel electrode layer)
4: Solid electrode layer
6: Second electrode layer (oxygen electrode layer)
7, 7a, 7b, 7c: First layer
8: Interconnector layer
11: Second layer
18: Fuel cell module
23: Fuel cell device
a: Element portion

The invention claimed is:

1. A cell, comprising:
an element portion comprising:
  a first electrode layer serving as a tubular support body;
  a second electrode layer; and
  a solid electrolyte layer located between the first electrode layer and the second electrode layer, the solid electrolyte layer containing an oxide as a primary component and a first content of a rare earth element, the solid electrolyte layer having a thickness of 30 μm or less, and having a region devoid of the second electrode layer; and
a first layer located in the region, the first layer containing the oxide as a primary component and a second content of the rare earth element, the second content being different from the first content, the first layer having a higher strength than the solid electrolyte layer.

2. A cell, comprising:
a plurality of element portions on an insulating elliptical tubular support body, each element portion comprising:
  a first electrode layer located on the insulating elliptical tubular support body;
  a second electrode layer; and
  a solid electrolyte layer located between the first electrode layer and the second electrode layer, the solid electrolyte layer containing an oxide as a primary component and a first content of a rare earth element, the solid electrolyte layer having a thickness of 30 μm or less, and having a region devoid of the second electrode layer; and
a first layer located in the region, the first layer containing the oxide as a primary component and a second content of the rare earth element, the second content being different from the first content, the first layer having a higher strength than the solid electrolyte layer.

3. A cell, comprising:
a support body having a elliptical tubular shape, the support body comprising:
  a first main face on one side in a thickness direction of the support body;
  a second main face on the other side in the thickness direction;
  a first portion located at one end in a length direction of the support body; and
  a second portion located at the other end in the length direction;
an element portion on the first main face comprising:
  a first electrode layer located on the first main face;
  a second electrode layer; and
  a solid electrolyte layer located between the first electrode layer and the second electrode layer, the solid electrolyte layer containing an oxide as a primary component and a first content of a rare earth element, the solid electrolyte layer having a thickness of 30 μm or less, and having a region devoid of the second electrode layer; and
a first layer located in the region, the first layer containing the oxide as a primary component and a second content of the rare earth element, the second content being different from the first content, the first layer having a higher strength than the solid electrolyte layer.

4. The cell according to 3, wherein the region is on the first portion.

5. The cell according to claim 3, wherein the first layer and the region are provided along the length direction.

6. The cell according to claim 3, wherein the region is on the second portion.

7. The cell according to claim 3, wherein a thickness of the first layer is greater than a thickness of the solid electrolyte layer.

8. The cell according to claim 3, further comprising:
an interconnector layer on the second main face; and
a second layer located between the support body and the interconnector layer, the second layer containing the oxide as a primary component and a third content of the rare earth element, the third content being different from the first content, the second layer having a higher strength than the solid electrolyte layer.

9. The cell according to claim 8, wherein a thickness of the second layer is greater than a thickness of the solid electrolyte layer.

10. The cell according to claim 8, wherein the region is on the first portion, and
the second layer is provided on the first portion of the second main face, and a length of the first layer in a longitudinal direction is less than a length of the second layer in the longitudinal direction.

11. A cell stack device comprising a plurality of the cells according to claim 1, the plurality of cells being electrically connected.

12. The cell stack device according to claim 11, wherein the first portion is bonded to a gas tank by an insulating bonding material.

13. A module configured to house the cell stack device described in claim 11 in a housing container.

14. A module housing device configured to house the module described in claim 13 and an auxiliary device for actuating the module in an exterior case.

* * * * *